United States Patent [19]

Uemura et al.

[11] 4,177,742

[45] Dec. 11, 1979

[54] INCINERATOR FOR BURNING WASTE AND A METHOD OF UTILIZING SAME

[75] Inventors: Toshio Uemura; Yoshiki Watanabe; Yoji Masumoto; Tomihisa Ishikawa; Noboru Kajimoto, all of Kure; Shin Kawada, Tokyo, all of Japan

[73] Assignee: Babcock-Hitachi Kabushiki Kaisha, Tokyo, Japan

[21] Appl. No.: 893,261

[22] Filed: Apr. 5, 1978

[51] Int. Cl.² .............................................. F23G 7/00
[52] U.S. Cl. .................................... 110/346; 110/245
[58] Field of Search ................................ 110/245, 346

[56] References Cited

U.S. PATENT DOCUMENTS

| 3,397,657 | 8/1968 | Tada | 110/245 |
| 3,776,150 | 12/1973 | Evans et al. | 110/346 |
| 3,779,181 | 12/1973 | Staffin et al. | 110/245 |
| 4,060,041 | 11/1977 | Sowards | 110/346 |

Primary Examiner—Kenneth W. Sprague
Attorney, Agent, or Firm—Koda and Androlia

[57] ABSTRACT

An incinerator for burning waste including a hollow body having an opened upper end and an opened lower end, a bottom plate closing the lower end, a central opening provided in the bottom plate for introducing pressurized oxidizing gas into the hollow body, a plurality of circumferentially disposed openings provided in the bottom plate for introducing pressurized oxidizing gas into the hollow body, an oxidizing gas feeding means for supplying gas to the central opening and the circumferentially disposed openings, heat transfer medium particles provided in the hollow body and fluidized by the oxidizing gas introduced into the hollow body and a means for feeding waste into the hollow body.

6 Claims, 11 Drawing Figures

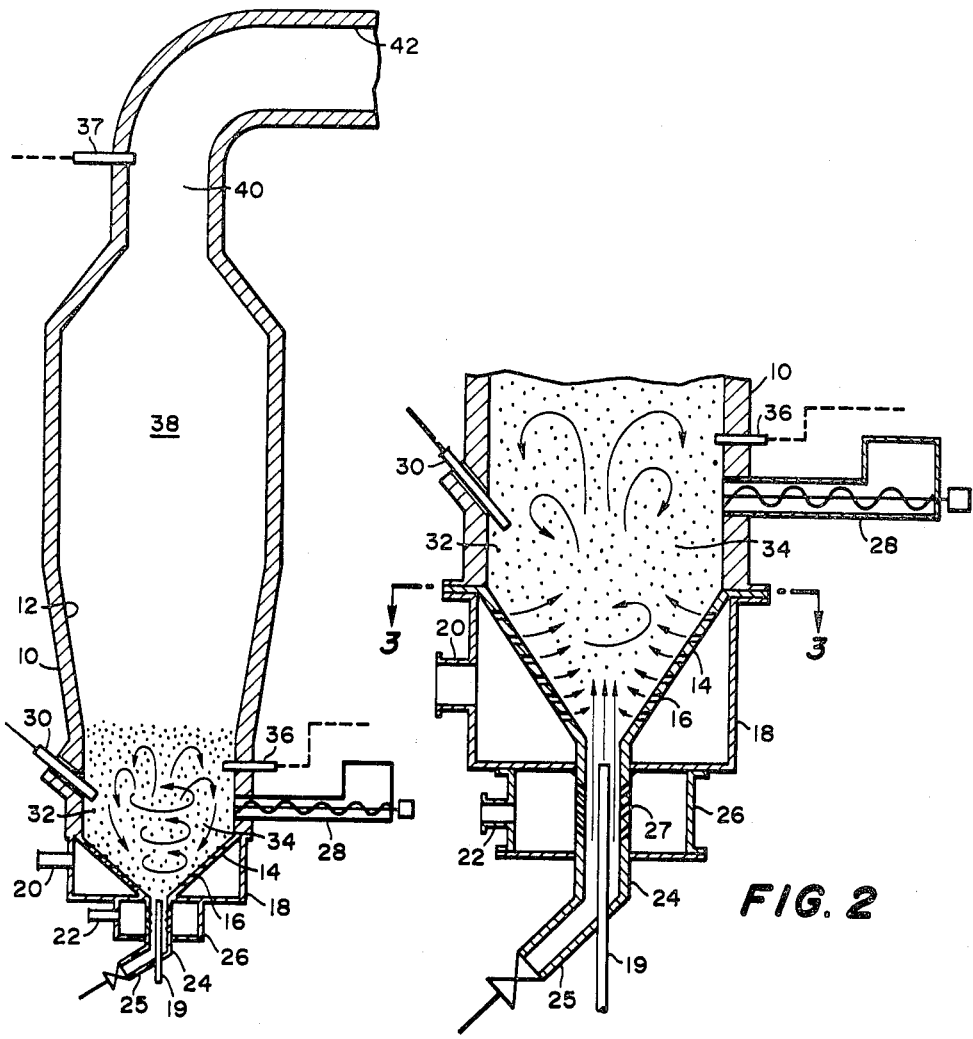
FIG. 1
FIG. 2
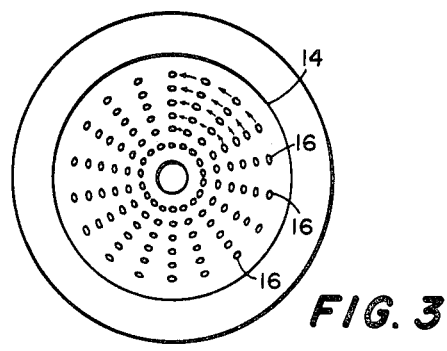
FIG. 3

INCINERATOR FOR BURNING WASTE AND A METHOD OF UTILIZING SAME

BACKGROUND OF THE INVENTION

1. Field of Invention

The present invention relates to an incinerator for burning industrial waste such as dust or sludge discharged from chemical plants and from thermal power plants, and waste such as municipal refuse.

2. Prior Art

Exhaust gas discharged from the boilers which burn fossil fuel contains dust that is collected by a bag-filter, cyclone collector or electric precipitator. However, recently, machines and apparatuses for use in steel industry, chemical industry and electric power industry have become very large, thereby increasing the amount of dust collected per dust collector to a very high extent. For example, the amount of dust collected by dust correctors from exhausted gas from a boiler for the generation of electric power of 1 million Kw output is about 1-3 m$^3$ per hour, though the amount depends on the amount of dust contained in the exhaust gas, the collecting efficiency of the dust collector used and the bulk density of the dust.

Dust contained in the conbustion gas from the burning of a fossil fuel such as heavy oil has the following characteristics.

(1) The bulk specific gravity is as small as 0.1-0.2 g/cc. (2) The amount of combustible components (carbon and sulphuric acid) is about 90%.

(3) The amount of incombustible components (ash) is about 10%, but composed mostly of elements such as vanadium (V) and nickel (Ni).

The dust described above has a large bulk specific gravity, difficult to handle and transport efficiently, and moreover, creates a public nuisance by scattering dust and acidifying the soil. Therefore, it is difficult to dispose of this type of dust. Consequently, a method has been practised that the dust described above is incinerated to decrease it in volume and elements remaining are concentrated to be recovered.

On the other hand, sludge discharged from thermal power plants is produced during processing of waste water from ejectors for airflow-transporting of dust collected by dust collectors, waste water from coal yards, and the like. The disposal of the sludge described above also causes a public nuisance. Therefore, a method has been practised that sludge after being dehydrated is incinerated in the same manner as the dust.

Heretofore, rotary kilns and fluidized bed furnaces have been mainly used as an incenerator for wastes such as dust and sludge. According to the method using a rotary kiln, an additive functioning as a melting point raiser and a granulation promoter, such as magnesium hydroxide, is applied to the dust or sludge which is then formed into pellets through a pelletizer and thrown into a rotary kiln so as to be incinerated or calcined. However, according to this method, sludge is not fully incinerated. To better incinerate it, it may be required that the dimensions of the rotary kiln should be enlarged and additional devices should be provided for treating harmful gaseous components and malodor. Further, low melting point compounds contained in the waste such as vanadium pentoxide and sodium chloride stick to the inner walls of the kiln. Therefore, attention should be paid to the distribution of temperature in the kiln. On the other hand, according to the method using a fluidized bed furnace, a heat transfer medium such as sand is fluidized by ejecting gas into the furnace to form a fluidized bed in which waste is incinerated. This method has such an advantage that, in general, powdered materials such as dust and sludge are suitable for fluidization and are incinerated easily, and the heat capacity of the furnace is high, so that self-combustion can be readily sustained; whereas, there is such a disadvantage that incombustible components which can be molten, particularly vanadium or sodium compounds are molten in the furnace and stick to the inner wall of the furnace. For example, the dust collected from combustion gases of petroleum fuels contains about 10% ash (incombustible components), which is composed mainly of compounds of vanadium, particularly vanadium pentoxide ($V_2O_5$) whose melting point is 670° C. Consequently, when the dust is incinerated in an ordinary fluidizing bed furnace in the self-combustion temperature region ranging from 700° C. to 800° C., vanadium pentoxide ($V_2O_5$) is molten and exudes onto the surface of dust particle, whereby the dust particle sticks to the inner wall and the inlet for the gas to the furnace, for example, a perforated plate for introducing gas into the furnace. As a result clinkers are formed in the fluidized bed so that fluidizing of the waste is interrupted and the combustion in a fluidized state is made difficult.

Furthermore, when ammonium ($NH_3$) gas is used as an electrolyte for accelerating deposition of dust in the electric precipitator or as a reducing agent for eliminating nitrogen oxides ($NO_x$) in combustion gas of petroleum fuels, the dust collected from the combustion gas contains a large amount of ammonium sulfate [$(NH_4)_2SO_4$] produced in the reaction of $NH_3$ with $SO_3$ from the sulfur components contained in the fuel. The ammonium sulfate becomes molten in the furnace in the same manner as the vanadium compounds, sticks to the inner wall of a furnace and the like, thus causing troubles similarly to the above.

SUMMARY OF THE INVENTION

Accordingly, it is a general object of the present invention to provide an incinerator for burning industrial waste such as dust and sludge in a fluidized bed at a high combustion efficiency.

It is another object of the present invention to provide an incinerator for burning industrial waste, wherein the sticking of dust to the inner wall thereof due to the melting of low melting point compounds can be eliminated.

It is a further object of the present invention to provide an incinerator for burning industrial waste wherein valuable metals or metallic compounds contained in the waste can be recovered as ash after combustion.

It is a still further object of the present invention to provide an incinerator for burning industrial waste, wherein waste such as combustible dust or sludge containing inorganic compounds having low melting points is subjected to self-combustion at a relatively low temperature.

It is a yet further object of the present invention to provide a process for burning industrial waste in a fluidized bed at high combustion efficiency.

In accordance with the present invention, there is provided an incinerator, which generally includes a bottom plate provided at the center thereof with an upwardly directed opening for introducing pressurized oxidizing gas and having a multiplicity of openings for introducing pressurized oxidizing gas, disposed in the circumferential directions respectively at the inner periphery of the plate, an oxidizing gas feeding means for ejecting the gas from the opening at the center of the plate and from the openings at the inner periphery of the plate, respectively, a cylindrical body vertically connected at the lower end thereof to the bottom plate and provided at the upper end thereof with an exit for the discharge of combustion gas, heat transfer medium particles contained in the cylindrical body and fluidized by the gas ejected through the openings in the bottom plate and means of feeding industrial waste into the cylindrical body.

In accordance with the present invention, there is also generally provided a process for burning industrial waste, which includes the steps of forming a swirling blast fluidized bed above a perforated plate in an incinerator by blowing oxidizing gas through the perforated plate in an upwardly vertical and horizontally circumferential directions to mix the waste in the fluidized bed with a heating medium and burn at the temperature of 500° C.–1000° C., retaining the resultant combustion gas in the free space above the fluidized bed for a sufficient period of time required for the combustion of unburned components contained in the combustion gas, and thereafter discharging the combustion gas from the outlet above a free space of the incinerator, blowing cooling air into the outlet for combustion gas so that the temperature of the gas discharged through the outlet can be maintained within the range from 350° C. to 670° C.

BRIEF DESCRIPTION OF THE DRAWINGS

The present invention can be fully understood from the following description, taken in connection with the accompanying drawings wherein like elements are given like reference numerals and in which:

FIG. 1 is an elevational section view of a preferred embodiment of an incinerator containing heating medium and waste in accordance with the teachings of the present invention;

FIG. 2 is an enlarged view of part of the incinerator shown in FIG. 1;

FIG. 3 is a sectional view taken along the line 3—3 of FIG. 2.

DETAILED DESCRIPTION OF THE INVENTION

Figure 4:
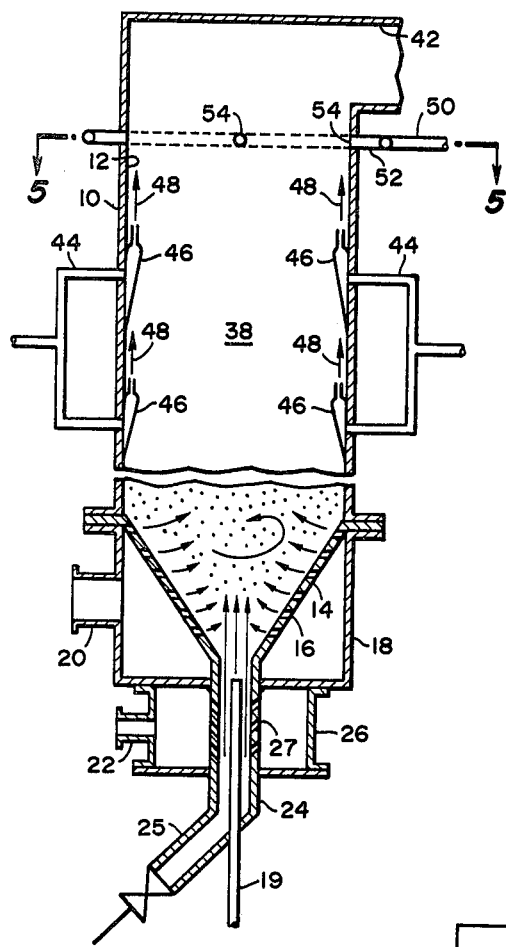
FIG. 4 is an elevational section view of another preferred embodiment of an incinerator according to the present invention, which is provided with a wall-cooling device on the inner wall thereof.

A general outline of an incinerator using the fluidized bed according to the present invention is shown in FIG. 1, and the details of the fluidized bed in FIG. 2. In the drawings, the cylindrical body 12 of the incinerator 10 is of a tower-like shape and on the outer surface of which is applied a thermally insulating material. The body 12 is provided at the bottom thereof with a cone-shaped perforate plate 14 having a multiplicity of nozzles 16 for feeding pressurized air which gives intensive fluidized swirls to a fluidized heat transfer medium 32 contained in the body 12 and which is used as oxidizing gas. As shown in FIG. 3, nozzles 16 are disposed in circumferential directions of the cone-shaped plate, respectively. A pressurized air chamber 18 is provided beneath the plate 14. The pressurized air chamber 18 is fed with pressurized air from a pipe 20. Additionally, the cone-shaped perforate plate is provided at the lower end thereof with a pressurized air feed pipe 24 whose lower end is a combustion residue discharge pipe 25. An air feed nozzle 19 is inserted through the central portion of the pressurized air feed pipe 24 and pressurized air is blown into the incinerator through the air feed nozzle 19. Surrounding the pressurized air feed pipe 24 is a pressurized air chamber 26. Air is fed through nozzles 27 formed in the pipe wall of the pressurized air feed pipe 24 so that the pipe portion can be prevented from being blocked by combustion residue.

Waste material is fed into the incinerator through the side walls at the lower portion of the incinerator 10 by waste feeding means (screw feeder) 28. Additionally, a burner 30 for the purpose of starting or assisting burning is provided through the side wall of the incinerator. Heat transfer medium particles 32, such as sand, is contained in the incinerator. Heat transfer medium 32 is fluidized in the arrow-marked direction by air blown out of nozzles 16 and pipe 19, intensely swirled to be formed into a fluidized bed, heated to a high temperature and mixed with the waste fed by the waste feeding means 28. As a result any combustible components of the waste is burned.

The temperature of the fluidized bed 34 is detected by a temperature detector 36. Combustion gases pass through a free space 38, i.e. a space upwardly of the fluidized bed 34 in the incinerator, an outlet 40, a duct 42 and discharged to the outside of furnace. The outlet 40 is provided with a temperature detector 37 which detects the temperature of exhaust gas. The nozzles 16 formed in the perforate plate 14 are horizontally disposed in the circumferential direction of the perforated plate 14. However, the nozzles may be disposed with each having a slight upward inclination to obtain upward swirling.

According to the present invention, when the waste is dust which is mainly composed of ammonium sulfate is burned, the height of the free space 38 may preferably be 5 m or more in general. Additionally, it is preferable that the residence time of combustion gases in the free space 38 be from about 3.5 to 4.0 sec or more under a temperature of about 650° C.–700° C., and that the average flow rate of the combustion gases be from 0.5 to 1.0 m/sec.

The temperature of the fluidized bed according to the present invention is selected from 500° C. to 1000° C. depending upon the properties of the waste to be burnt. When general industrial waste is burnt, the temperature is maintained in the range from 550° C. to 800° C. When dust corrected from waste gas from boilers for thermal power plant is burnt, the temperature is maintained in the range from 550° C. to 780° C. and preferably from 580° C. to 730° C. If the temperature is is lower than 550° C., then unburned carbon contained in the dust is not fully burned; if the temperature is higher than 780° C., then low melting point compounds contained in the combustion residue are unsuitably fused to the inner wall and the perforated bottom plate of an incinerator.

Figure 5:
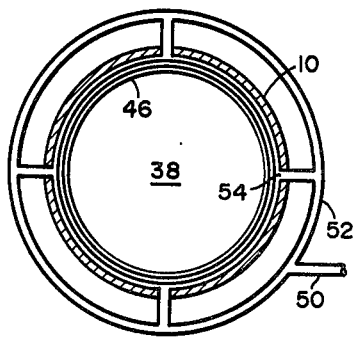
FIG. 5 is a sectional view taken along the line 5—5 of FIG. 4.

In order to prevent the low melting point compounds from being fused to the inner wall in the free space 38 of the incinerator, it is desirable to flow cooling air along the inner side wall and form an air curtain around the combustion zone in the free space. As a results the temperature of the inner wall of the incinerator is lower than melting points of the low melting point compounds (in the case of vanadium pentoxide, 670° C.). An example of the inner wall cooling means is indicated in FIGS. 4 and 5. In the drawings, inserted into the incinerator along the inner wall surrounding the free space 38 are a plurality of air introducing pipes 44 whose openings to the free space are formed into upwardly directed slits 46 so that air introduced through the air introducing pipes 44 can be allowed to flow upwards along the inner wall of incinerator. Air introduced into the incinerator through the slits 46 flows along the inner wall of the incinerator in the direction indicated by an arrow 48 so as to form an air curtain. Thus, the rise in temperature of the inner wall of the free space 38 and the sticking of dust to the said inner wall due to the melting of the low melting point compounds can be prevented.

Combustion gases passing through the free space 38 and discharged from the outlet above said free space 38 contain therein molten compounds of vanadium, for example. Hence, if the combustion gases are directly introduced to a duct 42, through the outlet 40, the compounds of vanadium stick to the inner wall surface of the duct 42. For this reason, nozzles 54 for introducing cooling air through an air introducing pipe 50 and a ring header 52 may be provided in the inner wall in front of the duct in the upper portion of the free space 38. The combustion gases are cooled to lower than the melting points of low melting point compounds (e.g. 670° C. in the case of vanadium pentoxide) by sending cooling air into the upper portion of the free space through the nozzles. As a result, the low melting point compounds are coagulated, thereby preventing the compounds from being stuck to the inner wall of the duct 42.

Figure 6:
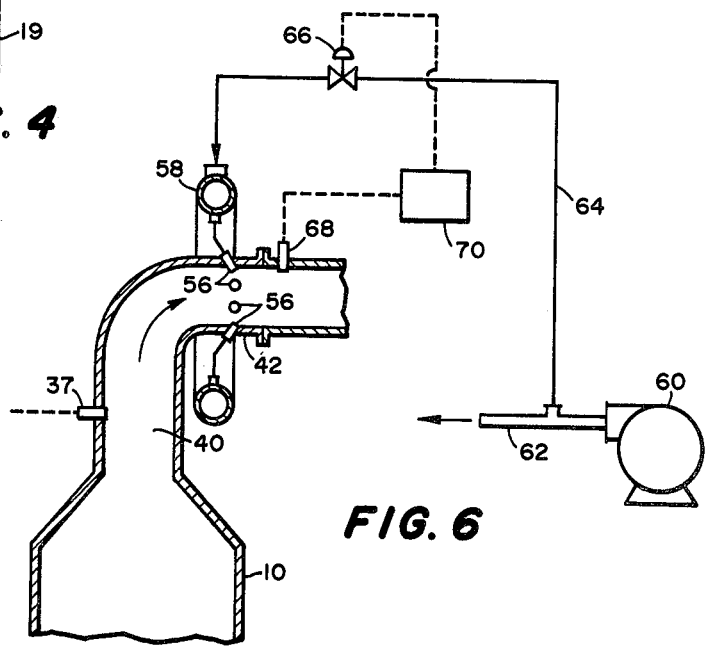
FIG. 6 is an illustrative view of a preferred embodiment of a temperature controll system for combustion gas passing through the outlet of an incinerator according to the present invention.

In order to coagulate the low melting point compounds contained in the combustion gas being discharged from the outlet 40 and reduce the corrosion by sulphuric acid gas, for example, contained in the exhaust gases, it is possible to provide exhaust gas cooling means and temperature controlling means therefor in the duct 42 communicated with the outlet 40. An example of such a means is shown in FIG. 6.

The cooling air feeding means is basically identical with that shown in FIG. 5. In particular, a plurality of cooling air feeding nozzles 56 are arranged in the side wall of the duct 42 adjacent to the outlet 40 for exhaust gases and cooling air is fed to the nozzles 56 through a ring header 58. The cooling air may be fed by an independent fan or may be fed in such a manner that a pipe line 64 is branched from a main pipe line 62 of a main forced fan 60 and the pipe line 64 is connected to said ring header 58 through a cooling air flow rate control valve 66. The temperature of exhaust gas flowing out of the outlet 40 is detected by a temperature detector 68, and the resultant temperature signal is sent to a temperature controller 70. The temperature controller 70 sends out a signal corresponding to the difference from a preset temperature value to a cooling air flow rate control valve 66 provided at the branched pipe line 64 and controls the flow rate of the cooling air fed. In the case where the dust is collected from waste gas from boilers using fossil fuels, the setting value for the temperature of the temperature controller 70 is higher than the dew point of sulphuric acid (about 350° C.) and lower than the melting point of vanadium pentoxide (670° C.), preferably about 500° C. At about 500° C., unburned carbon in the combustion residue particles accompanied by the combustion gases is still being burned as embers. However, the low melting point compounds on the outer surfaces of the particles have begun to become solid, and hence, even if the particles are piled up, they do not fuse together.

With the incinerator according to the present invention, the fluidized heat transfer medium above the perforated plate is fluidized by flowing oxidizing gas through the nozzle 16 and pipe 24 in the vertical and circumferential directions to make swirls in the fluidized bed and is mixed with the dust in many directions, and hence, the fluidized heat transfer medium is the bed has no static portion at all. Additionally, the heat capacity of the incinerator is large due to the presence of the fluidized heat transfer medium therein, whereby the combustion efficiency becomes high which results in self-combustion of the waste at a relatively low temperature. Furthermore, the cohesion or agglomelation of the waste particles due to the melting of the low melting point compounds, the sticking of the waste to the perforated plate and the inner wall of incinerator and the piling of the waste can be prevented by the combustion under intensive stirring and at relatively low temperature.

Figure 7:
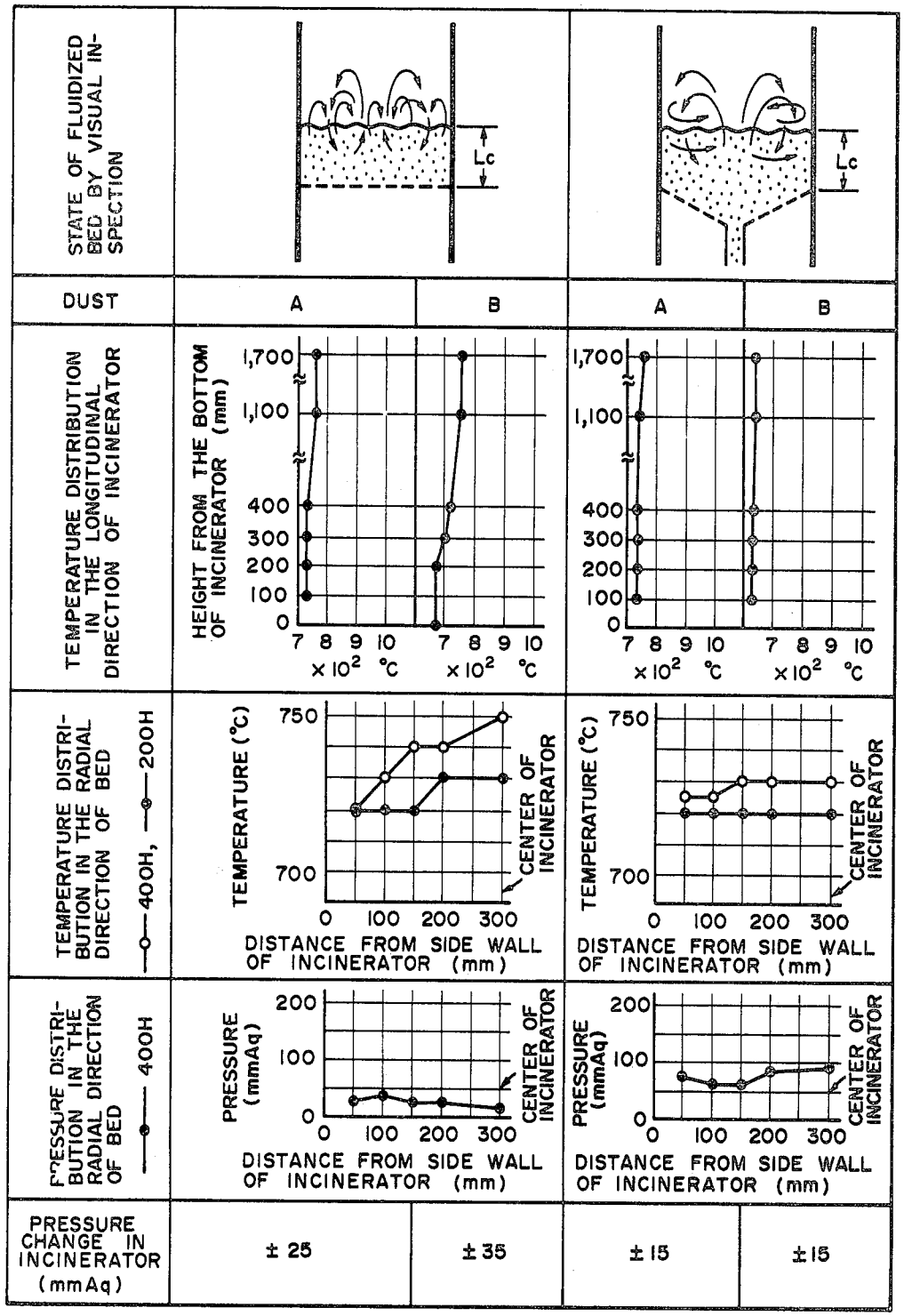
FIG. 7 is a diagram for illustrating the temperature and pressure distribution of the combustion gas in an incinerator according to the present invention as compared with those of a conventional incinerator using a fluidized bed.

FIG. 7 indicates examples of the characteristics of the conventional fluidized bed furnace of a flat tray shape having a fluidized bed of a diameter of 600 mm and the incinerator according to the present invention having the same diameter as above (the amount of dust processing is each 100 Kg/hr). In the drawing, the heat capacities of the dust A and B are 1530 Kcal/kg and 2500 Kcal/kg, respectively, and the height Lc of fluidized bed is 400 mm. From the drawing, the following is apparent.

(1) The distribution of temperature in the longitudinal direction of the incinerator:

in the conventional fluidized bed furnace, both dust A and B supplied have a rise in temperature of about 720° C.+20° C. at the bed temperature at portions 1,000–1,700 mm upwardly of the fluidized bed. This is because the incompletely burned components in the fluidized bed are being burned in the free space, which indicates that the incinerator according to the present invention has a higher combustion rate than the conventional fluidized bed furnace when an equal amount (100 kg/hr) is processed in each furnace.

(2) The distribution of temperature in the cross-sectional direction of the bed:

with respect to the distribution of temperature at points at a pitch of 50 mm from the side wall of furnace to the center of furnace and at the heights of 100, 200 and 400 mm from the flange of perforated plate, the fluidized bed according to the present invention has a substantially uniform distribution of temperature, whereas the conventional fluidized bed has a concentrically convex distribution of temperature with the center of furnace which is 10°–30° C. higher in temperature than the portions other than the center.

(3) The distribution of pressure in bed:

the back pressures at the points of the above distribution of temperature were measured. The pressure in the fluidized bed according to the present invention is higher by about 50 mm Aq than in the conventional fluidized bed, which indicates, in the fluidized bed according to the present invention, the fluidization of the heat transfer medium is active and the pressure distribution across the furnace has a convex shape due to the effect of the swirl air blast.

(4) The pressure change in furnace:

the pressure change in the conventional fluidized bed is ±25 mmAq–±35 mmAq, whereas that in the fluidized bed according to the present invention is ±15 mmAq. As compared with the conventional fluidized bed, the combustion rate in the bed is high and the combustion in the free space is lower than that in the bed, both of which are in accordance with the results obtained in the above item (1).

As has been described above, it is apparent that the incinerator according to the present invention has excellent combustion characteristics as compared with the conventional fluidized bed furnace.

Figure 8:
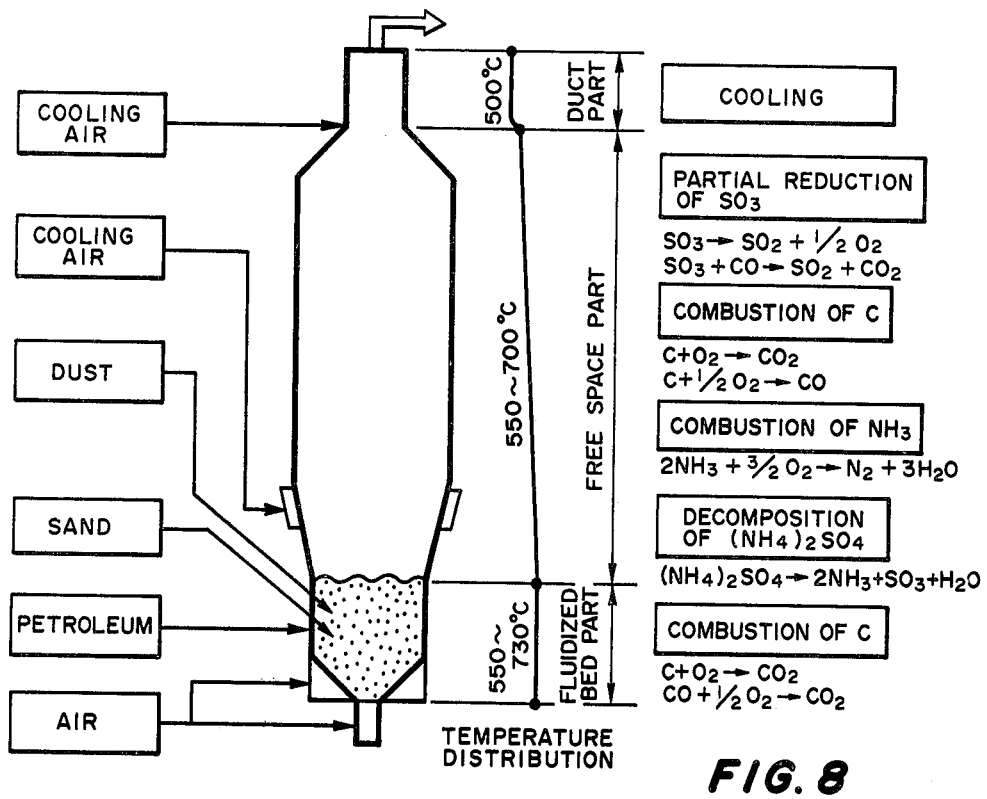
FIG. 8 is a diagram for illustrating preferable temperature ranges in the incinerator and the way of thermal decomposition of the materials in the incinerator within those temperature ranges according to the present invention.

FIG. 8 indicates the distribution of temperature in the furnace and the decomposition process of the components contained in the dust for the case wherein dust mainly containing ammonium sulfate and carbon is burned by use of the incinerator according to the present invention.

The temperature of the fluidized bed in the incinerator according to the present invention is preset to 550° C.–730° C. in consideration of the perfect combustion of carbon and the prevention of the dust from becoming molten and sticking. This range of temperature is secured by controlling the quantity of dust and air supplied to the incinerator. Carbon begins to burn at 450° C. and above in the bed. Although vanadium pentoxide ($V_2O_5$) is molten at 670° C., it never sticks to the furnace wall because the content of vanadium pentoxide is comparatively low and the dust is intensively stirred in the bed. Ammonium sulfate [$(NH_4)_2SO_4$] begins to be softened at about 120° C., liquefied and solidified in several minutes. Consequently, it is desirable to use rapid heating, stirring and disintegration during its decomposition and combustion, which suits well to the incinerator according to the present invention.

Ammonium sulfate [$(NH_4)_2SO_4$] decomposes at two steps in the temperature range from 288° C. to 490° C., and is finally decomposed to $NH_3$ and $SO_3$ as shown in the following formula.

$$(NH_4)_2SO_4 \rightarrow 2NH_3 + SO_3 + H_2O \tag{1}$$

The $NH_3$ and $SO_3$ further reacts in the free space above the bed according to the following formulae (2) and (3).

$$2NH_3 + 3/2O_2 \rightarrow N_2 + 3H_2O \tag{2}$$

$$SO_3 \rightarrow SO_2 + 1/2O_2 \tag{3}$$

The height of the free space shall be determined so that the residential time of the combustion gas required for the completion of the above reaction (2) is secured.

With respect to the reaction rate constant of $NH_3$ in the above formula (2), the gas phase oxidation reaction (combustion reaction) rate constant K of $NH_3$ is appropriate for this case and is given by the following formula (4).

$$K = 10^{14.61} \cdot e^{(38,700/RT)} \tag{4}$$

Additionally, the combustion rate on $NH_3$ per unit reaction time and per unit reaction volume is given by the following formula (5).

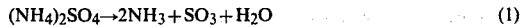

$$-d[NH_3] = K \cdot [NH_3] \cdot [O_2] \cdot dt \cdot dV \tag{5}$$

Figure 9:
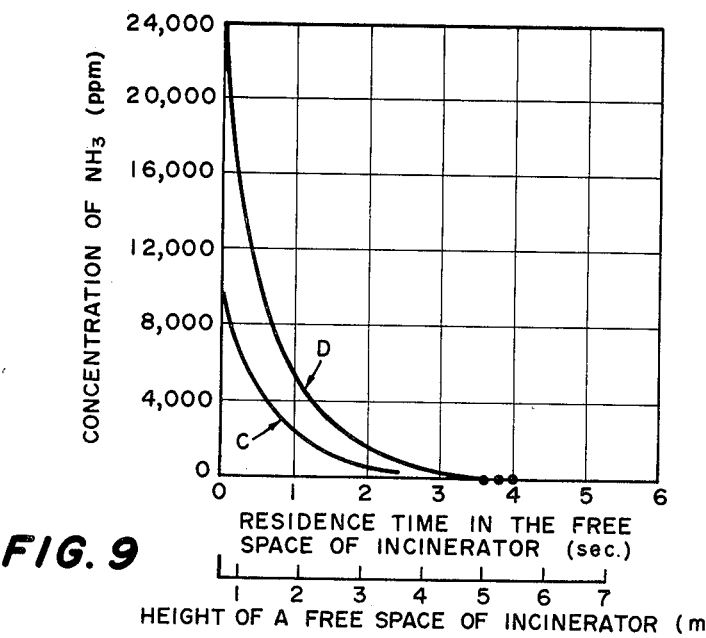
FIG. 9 is a diagram for illustrating the relationship between residential time of combustion gas in the incinerator and concentration of ammonium gas at the outlet of the incinerator.

FIG. 9 is a graphic chart illustrating the relationship between the residential tiem and the concentration of ammonia in the free space portion of the incinerator, both of which are calculated based on the above formulae (4) and (5) when ammonium sulfate contained in the dust is 30 weight % (c) and 75 weight % (D). In FIG. 9, the result of measuring concentration of ammonium in the combustion gas flowing out of the outlet of the incinerator is indicated by black spots. The concentration of $NH_3$ is 14,200 ppm at the inlet of free space portion of the incinerator, which is then rapidly burned in the high temperature zone in the vicinity of the inlet of the free space portion, reduced to about 500 ppm in one sec., and reduced to less than 1 ppm in the proximity of the furnace outlet in about 3.5–4.0 sec.. Namely, the residential time required for $NH_3$ in the gas to be substantially fully decomposed in the free space portion is about 3.5 sec. and more at about 550° C.–700° C., which corresponds to the height of the free space portion of about 5 meters and more. Additionally, in this case, the average flow rate of the gas in the free space portion was 0.5–1.0 m/sec. according to the experimental values.

As described above, $NH_3$ in the combustion gas is substantially fully burned, and regeneration and recrystallization of ammonium sulfate [$(NH_4)_2SO_4$], ammonium sulfite ($NH_4HSO_3$) and the like in the combustion gas after cooling can be prevented, whereas reduction of $SO_3$ according to the formula (2) gives only about 50–85% yield. For this reason, the temperature of combustion gas is maintained higher than the dew point of $SO_3$ (about 350° C.) and lower than the melting point of the low melting point compounds, usually at about 500° C., thus preventing the duct from being corroded by sulphuric acid and from the sticking of ash.

Figure 10:
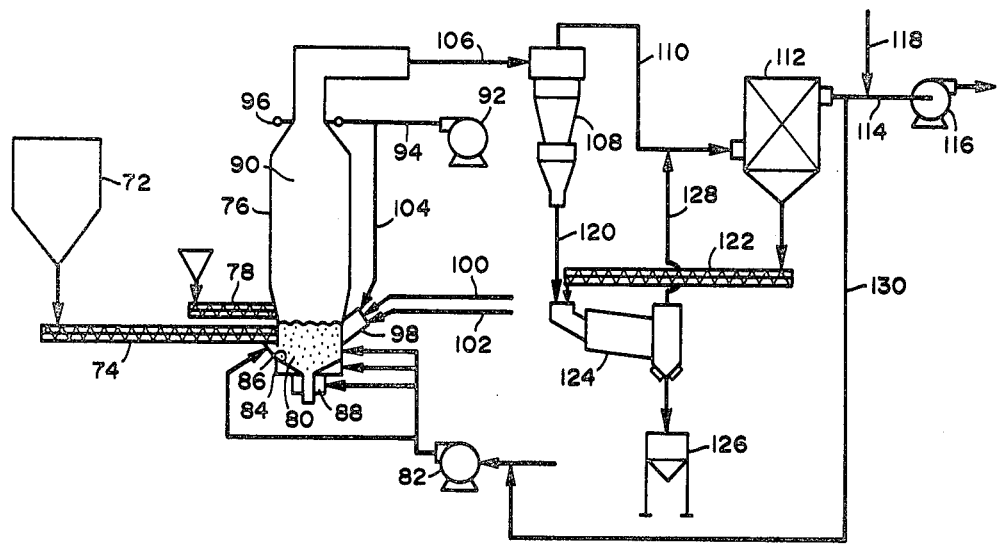
FIG. 10 is a flow of a preferred embodiment of the process for burning industrial waste by use of an incinerator according to the present invention.

Reffering to FIG. 10, description will hereunder be given of the process of incinerating dust containing ammonium sulfate and compounds of vanadium, collected by an electric precipitator in a thermal power plant, and sludge discharged from the thermal power plant by using the incinerator with the fluidized bed according to the present invention and using a rotary kiln thereafter. In the drawing, dust collected by the electric precipitator is contained in a tank 72, and fed to the fluidized bed 80 of an incinerator 76 by a screw feeder 74 for dust feeding. Dust may be directly supplied to an incinerator by use of the screw feeder or a pneumatic conveyor without using the tank 72. When dust collected by an electric precipitator is added to water to be formed into pellets and used as the feed material, an electromagnetic vibrating feeder may be used. While, sludge, as another feed material, may be supplied to the incinerator 76 by a screw feeder 78. However, for feeding a constant quantity of sludge, an extruder with a piston is usable. The incinerator 76 having the fluidized bed 80 according to the present invention contains an inactive particles resistant to high temperature such as sand as the heat transfer medium of said fluidized bed 80. Part of the pressurized air supplied from forced fan 82 is fed to the fluidized bed 80 through an air chamber 84 and a cone-shaped perforated plate 86. Another part of the air is fed through an air chamber 88, and still other part of it is directly fed into the bed 80 from above the perforated plate. The closer to the axis of the incinerator, the denser the perforation of the perforated plate is, i.e. the larger the numerical aperture is, so that the fluidized bed can be readily formed. As dust and sludge are incinerated, the temperature of a free space 90 is elevated and unburned particles of the sludge and dust stick to the inner wall of the free space 76 as a result of low melting point materials such as vanadium oxide and the like. Hence, a layer of cooling air is formed adjacent the wall surface close to the free space 90, with the result that the temperature of the wall surface is cooled down to less than 670° C. This cooling means includes an air fan 92 for supplying cooling air, a pipe line 94 connected to the air fan 92, and nozzles 96 for forming the layer of cooling air along the inner wall surface of the incinerator 76. Additionally, the incinerator 76 is provided with an auxiliary burner 98 usable for starting the burning of the waste and controlling the combustion temperature thereof. A pipe line 100 supplies the air steam, a pipe line 102 supplies a fuel such as light oil, and a pipe line 104 branched from the pipe line 94 supplies air for combustion in the auxiliary burner 98.

Exhaust gas containing unburned particles discharged from the incinerator 76 passes through a pipe line 106, and is sent to a single cyclone 108 where large size particles are separated therefrom. The exhaust gas further passes through a pipe line 110, a multicyclone 112, a pipe line 114 and an induction fan 116, and is discharged into a boiler flue which constitutes a pipe line to an electric precipitator. At the same time, air is supplied from a pipe line 118 to a pipe line 114 for controlling the temperature of the exhaust gas.

All or part of the exhaust gas from multicyclone 112 can be recycled to the incinerator 76 through line 130 and fan 82 and be used as a oxidizing gas. Thus, the temperature of the fluidized bed 80 and free space 90 is prevented from rising too high due to the excess amount of oxygen in the oxidizing gas. The reason why the exhaust gas is preferably recycled is described below. The amount of an oxidizing gas necessary to burn the waste in a fluidized bed is not in accorance with that of the gas required to make fluidized bed. For instance, for the case where the amount of waste to be burned is small and the air required to burn the waste is a small amount, the amount of air required to form a fluidized bed becomes too excessive for burning the waste and results in making the temperature of the bed too high. As a result, the incinerator generates a considerable amount of nitrogen oxides. Generally, 20-50 vol % of the combustion gas is recycled to the incinerator.

The dust containing unburned particles, separated in the single cyclone 108 and multicyclone 112 is then supplied to a rotary kiln 124 through a pipe line 120 and screw conveyor 122, respectively. The perfect combustion of the unburned components remaining in the dust and the pelletizing of the dust is performed in the rotary kiln 124, and thereafter, the pellets thus produced are supplied to an ash bunker 126. Exhaust gas discharged from the rotary kiln 124 is sent to the pipe line 110 through a pipe line 128.

In the incinerator 76, sludge and dust are diffused over all of the fluidized bed according to the present invention by intense mixing and agitating motions of the fluidized heat transfer medium, and simultaneously heated and dried by heat of the fluidized heat transfer medium. At this time, the sludge is disintegrated and burned while floating moving among the particles of the fluidized heat transfer medium. Volatile combustible components contained in the sludge are gasified and burned, solid combustible components mainly composed of carbon are ignited and burned, and the ash thus obtained is atomized. On the other hand, ammonium sulfate contained in the dust is instantly decomposed and gasified; and further the combustion of ammonium and the ignition and combustion of carbon contained are performed.

The free space 90 upwardly of the fluidized bed 80 includes a gaseous phase being a continuous phase and a diluted phase of the fluidized heat transfer medium particles acting as a discontinuous phase. Carbon particles skipping out from the fluidized bed 80 in unburned state are brought into contact with oxygen and burned, and part of the $SO_3$ generated from the decomposition of ammonium sulfate is dissociated.

In the rotary kiln 124 used as an after combustion furnace, unburned components remained in the ash are burned in parallel flow and pellets are produced. In this case, usually a small amount of auxiliary burning is performed and the flow rate of gas is lowered so as to prevent fly ash from scattering. The combustion gas discharged from the rotary kiln 124 is sent to a multicyclone 112 where ash is collected therefrom, and recirculated to the electric precipitator in the boiler flue by the induction fan 116, thus enabling the incineration to act as a perfectly closed system.

With this embodiment, sludge and dust are burned mainly in the fluidized bed, and hence, the load on the rotary kiln which is the after combustion furnace becomes less to a considerable extent. As compared with the combustion in the conventional rotary kiln, the capacity of the kiln may be made as small as one fifth, for example. Additionally, since the heat generation of ash to be burned in the rotary kiln is small, there is not seen any local rise in temperature during combustion, thereby enabling to decrease the amount of ash melting and sticking to the inner wall of the kiln.

EXAMPLE

Figure 11:
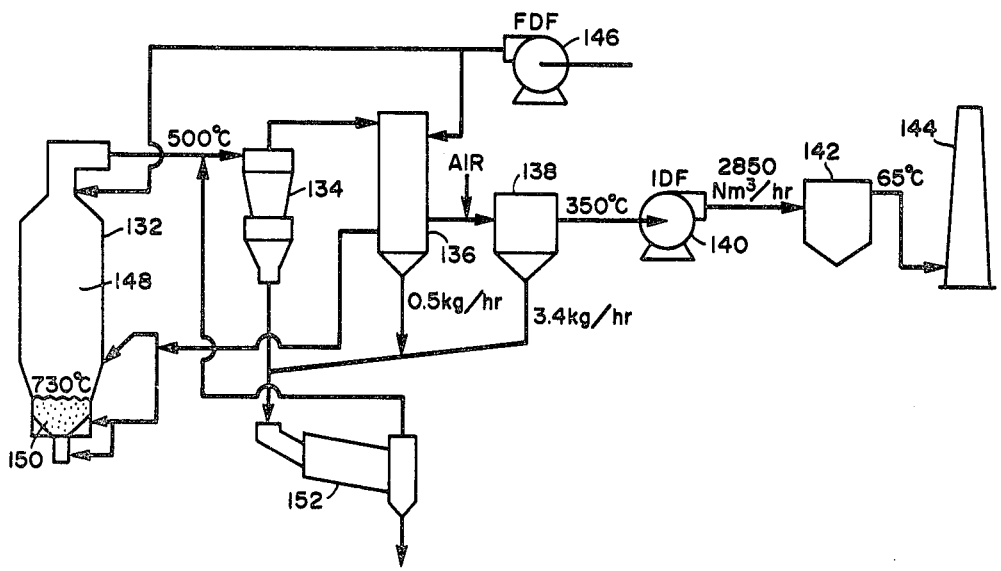
FIG. 11 is a flow diagram of another preferred embodiment of the process for burning industrial waste by use of the incinerator according to the present invention.

In this embodiment, the dust collected from electric precipitator of a boiler for a thermal power plant, is burned by use of the fluidized bed shown in FIG. 1 and according to the flow chart shown in FIG. 11. The composition of the dust includes carbon of 36% by weight, $(NH_4)_2SO_4$ of 54% by weight, ash of 10% by weight and a trace of water. The calorific value of the dust is 3000 Kcal/kg. The conditions of the fluidized bed is as follows:

| | |
|---|---|
| Open area of perforated plate | 1.0% |
| Thickness of perforated plate | 10mm |
| Diameter of the openings of perforated plate | 3mm |
| Inner diameter of incinerator | 600mm |
| Height of the free space | about 5m |
| Height of the fluidized bed (at the time of fluidizing) | 400mm |
| Air supplied to the fluidized bed | 600Nm³/hr |
| Temperature of the fluidized bed | about 730° C. |
| Air supplied as cooling air for cooling the inner wall of the free space portion | 190Nm³/hr |
| Air supplied as cooling air for the outlet of incinerator | 450Nm³/hr |
| Temperature of gas at the outlet of incinerator | 500° C. |

The exhaust gas discharbed from the outlet of incinerator is supplied to the byclone 134, sent to an air preheater 136 where the gas is subjected to heat exchange, supplied to a multicyclone 140, sent to a desulfurizer 142 by an induction draft fan 140, and discharged to atmosphere through a stack 144. Part of the cooling air is fed to the free space 148 of incinerator by a feed draft fan 146, and another part is fed to the fluidized bed 150 through an air preheater 136, respectively.

The amount of ash collected by the cyclone 134, air preheater 136 and multicyclone 140 are 5.8 kg/hr, 0.5 kg/hr and 3.4 kg/hr, respectively, all of which are supplied to an after combustion furnace (rotary kiln) 152 where unburned components are completely burned, and thereafter, discharged to outside. The total amount of ash discharged is 9.4 kg/hr and includes $V_2O_5$ of 5.42% by weight, carbon of 0.0% by weight, and $(NH_4)_2SO_4$ of 0.0%. The temperature of gases discharded from the multicyclone 138 is 350° C., the amount of gas supplied to the desulfurizer 142 is 2,850 Nm³/hr, and the temperature of gas at the outlet of the desulfurizer 142 is 65° C.

The incinerator according to the present invention has the following advantage:

(1) Since self-combustion can be performed at a relatively low temperature (less than 780° C.), auxiliary fuel can be minimized or dispensed with and the melting and agglomeration of dust in the fluidized bed, the resultant blocking of the bed and deterioration of heat resistant materials can be prevented.

(2) Since the burning load per cross-sectional area of the incinerator can be high, the installation area can be small as compared with the rotary kiln furnace, thus enabling one to attain higher burning efficiency.

(3) Since the temperature in the incinerator is low, the amount of nitrogen oxide ($NO_x$) contained in the combustion gases is low.

(4) Industrial waste such as dust and sludge materials of any shape such as particles, granules and blocks can be precessed, and there is a large flexibility with respect to the variations in the amount and composition. Additionally, the combustion residue is obtainable in powdered condition, and hence, easily packed, and valuable metals can be readily recovered.

It should be apparent that the above discribed embodiments are merely illustrative of but a few of the many possible embodiments which represent the applications of the principles of the present invention. Numerous and varied other arrangements can be readily devised by those skilled in the art without departing from the scope of the present invention.

We claim:

1. A process for burning waste in an incinerator of the type including a hollow body having an open upper end forming an outlet and an open lower end, a bottom plate closing the lower end, a central opening provided in the bottom plate for introducing pressurized oxidizing gas into the hollow body, a plurality of circumferentially disposed openings provided in the bottom plate for introducing pressurized oxidizing gas into the hollow body, an oxidizing gas feeding means for supplying gas to the central opening and circumferentially disposed openings, heat transfer medium particles provided in the hollow body and a means for feeding waste into the hollow body comprising the steps of:

forming a swirling blast fluidized bed of heat transfer medium particles above said bottom plate by blowing oxidizing gas through said central and circumferentially disposed openings in upwardly vertical and horizontally circumferential directions;

introducing waste into said fluidized bed;

burning said waste in said fluidized bed at between 500° C. and 1000° C.;

retaining any resulting combustion gas from said burning in a free space above said fluidized bed for a sufficient period of time required for combustion of any unburned components contained in said combustion gas;

discharging said combustion gas from said outlet; and blowing cooling air into said outlet to maintain the temperature of the combustion gas discharged through said outlet in a range from 350° C. to 670° C.

2. A process for burning waste according to claim 1 wherein the temperature of said fluidized bed is within the range of from 580° C. to 730° C. and the temperature of the discharged combustion gas is within the range of 450° C. to 550° C.

3. A process for burning waste according to claim 1 wherein the retaining time for combustion of any unburned components in said free space is more than 3.5 seconds.

4. A process for burning waste according to claim 1 further comprising the step of introducing dust collected from combustion gas discharged from said incinerator into a rotary kiln wherein any unburned components contained in said dust are burned.

5. A process for burning waste according to claim 1 wherein said oxidizing gas is air.

6. A process for burning waste according to claim 1 further comprises the step of introducing combustion gas recycled from said outlet as at least a portion of said oxidizing gas.

* * * * *